United States Patent
Miller et al.

(10) Patent No.: US 11,019,766 B2
(45) Date of Patent: Jun. 1, 2021

(54) LOW PROFILE VEHICLE

(71) Applicant: Worldwind Services, LLC, Tehachapi, CA (US)

(72) Inventors: Bryan Miller, Landers, CA (US); Brad Rolin, Tehachapi, CA (US)

(73) Assignee: Worldwind Services, LLC, Tehachapi, CA (US)

( * ) Notice: Subject to any disclaimer, the term of this patent is extended or adjusted under 35 U.S.C. 154(b) by 301 days.

(21) Appl. No.: 16/128,083

(22) Filed: Sep. 11, 2018

(65) Prior Publication Data

US 2019/0075722 A1 Mar. 14, 2019

Related U.S. Application Data

(60) Provisional application No. 62/556,946, filed on Sep. 11, 2017.

(51) Int. Cl.
| | |
|---|---|
| *A01D 34/64* | (2006.01) |
| *A01B 59/048* | (2006.01) |
| *A01D 34/835* | (2006.01) |
| *A01D 101/00* | (2006.01) |

(52) U.S. Cl.
CPC ............ *A01D 34/64* (2013.01); *A01B 59/048* (2013.01); *A01D 34/835* (2013.01); *A01D 2101/00* (2013.01)

(58) Field of Classification Search
CPC ...... A01D 34/64; A01D 34/68; A01D 34/835; A01B 59/048
See application file for complete search history.

(56) References Cited

U.S. PATENT DOCUMENTS

| | | | |
|---|---|---|---|
| 2,743,567 A | 5/1956 | Martin | |
| 2,865,159 A | 12/1958 | Musgrave | |
| 3,563,012 A | 2/1971 | Strasel | |
| 3,584,698 A | 6/1971 | Larson et al. | |
| 3,717,981 A | 2/1973 | van der Lely | |
| 3,819,001 A | 6/1974 | Pavelka | |
| 4,041,678 A | 8/1977 | Chaney et al. | |
| 4,294,026 A | 10/1981 | Welch | |
| 4,869,056 A * | 9/1989 | Lynch | A01D 34/866 56/15.2 |
| 4,876,845 A | 10/1989 | Sturgill | |
| 4,878,339 A * | 11/1989 | Maher | A01D 34/64 56/14.7 |
| 4,926,621 A | 5/1990 | Torras | |
| 4,949,534 A * | 8/1990 | Evans | A01D 34/64 56/13.8 |

(Continued)

*Primary Examiner* — Tony H Winner
(74) *Attorney, Agent, or Firm* — Sheridan Ross P.C.

(57) ABSTRACT

A low profile vehicle is provided. The vehicle includes front and rear modules joined to one another by a central truss. The vehicle further includes an operator seat with a bottom cushion having a support surface that is below an axle line of a wheel connected to the front module. The vehicle can include a mower assembly that is carried by the rear module. A steering linkage can be included to change an angle of the front module relative to the central truss and the rear module in a horizontal plane, allowing the vehicle to be steered. A ram acting on a rear pivot assembly can be included to change an angle of the rear module relative to the central truss and the front module in a vertical plane, allowing a height of the mower assembly to be varied.

20 Claims, 6 Drawing Sheets

(56) References Cited

U.S. PATENT DOCUMENTS

| | | | |
|---|---|---|---|
| 4,956,965 A | 9/1990 | Parsons, Jr. | |
| 5,133,174 A * | 7/1992 | Parsons, Jr. | A01D 75/30 |
| | | | 56/10.9 |
| 6,442,917 B1 | 9/2002 | Velke et al. | |
| 7,942,224 B2 | 5/2011 | Marshall et al. | |
| 8,713,904 B1 | 5/2014 | Goudy | |
| 9,554,514 B2 * | 1/2017 | Marotte | A01D 34/866 |
| 2017/0332542 A1 * | 11/2017 | Garcia | B60D 1/50 |

* cited by examiner

LOW PROFILE VEHICLE

CROSS-REFERENCE TO RELATED APPLICATIONS

This application claims the benefit of U.S. Provisional Patent Application Ser. No. 62/556,946, filed Sep. 11, 2017, the entire disclosure of which is hereby incorporated herein by reference.

FIELD

A low profile vehicle is provided. More particularly, a low profile, self-propelled mower is provided.

BACKGROUND

Utility scale solar power generation facilities and other installations require regular maintenance in order to operate as efficiently as possible. For example, control of weeds and grasses is necessary in order to ensure that ground mount solar panels are unobstructed by shadows, and to enable access to support structures and connections. Mowing is a preferred method for maintaining growth under and around solar panels. However, the typical design of such structures makes efficient mowing operations difficult. In particular, solar panels are often disposed on supports that place the panels approximately four feet above the ground. As a result, conventional riding or tractor mounted mowers cannot easily access areas under and around the solar panels.

More particularly, conventional self-propelled or towed mowers are typically associated with tractors. These tractors are typically configured to have a relatively short wheel base, which facilitates a short turning radius, and which results in a relatively tall structure. This can be exacerbated where the mower apparatus is mounted beneath the operator position. The resulting high profile of such vehicles make them unsuitable for use under ground mount solar panels, above-ground pipelines, or other structures.

Other approaches have used tractors with mower decks mounted to arms that extend to the side of the tractor. Although such approaches can be effective at placing the mower under structures that are low to the ground, they continue to rely on a relatively tall tractor, which can potentially collide with supported components, leading to expensive damage.

SUMMARY

The present disclosure is directed to a low-profile vehicle. At least some embodiments of the present disclosure are suited for use around and under utility scale solar panel installations. The vehicle includes a front module that is connected to a rear module by a central truss. The front module carries an operator seat having a support surface that lies below the axle line of the vehicle's front wheels. In accordance with at least some embodiments, the front module can include a set of auxiliary wheels mounted to a forward portion of the front module, in addition to the primary front wheels. The rear module carries a motor. The motor can provide a motive force for driving the mower and an included mower assembly. Moreover, where the vehicle is a mower, the mower assembly can be connected to the rear module.

More particularly, the mower assembly can include a motor driven flail type mower. The mower assembly can be connected to the rear module, and can sit beneath at least a portion of the central truss. As an example, but without limitation, the flail mower can have a width of approximately 9 feet. In addition, the maximum height of the low-profile mower can, in at least some embodiments, be less than or equal to 46 inches. In further embodiments, the maximum height of the low-profile mower can be less than or equal to 41 inches. The incorporation of a flail mower in a vehicle having a very low maximum height enables the low-profile mower to be used under solar panel assemblies, pipelines, or other installations where it is desirable to control the growth of weeds, and where a low-profile is necessary in order to avoid or minimize contact with installed structures while allowing efficient mowing patterns.

Further embodiments of the present disclosure include a steering linkage that enables the angle of the front module and the front wheels relative to the rear module and the rear wheels to be selectively changed. The steering linkage can be located at a substantially vertical pivot point connecting the central truss and the front module, and can be actuated by one or more hydraulic rams.

In accordance with at least some embodiments, the vehicle includes hydraulic motors for driving at least the rear wheels. Additionally, hydraulic rams can be provided for raising and lowering a mower assembly. As noted above, hydraulic rams can also be provided for articulating the vehicle at the connection between the front module and the central truss. A pump that is driven by a motor can be included to provide hydraulic pressure to the motors and rams.

Additional features and advantages of embodiments of the present disclosure will become more readily apparent from the following description, particularly when taken together with the accompanying drawings.

DETAILED DESCRIPTION

Figure 1:
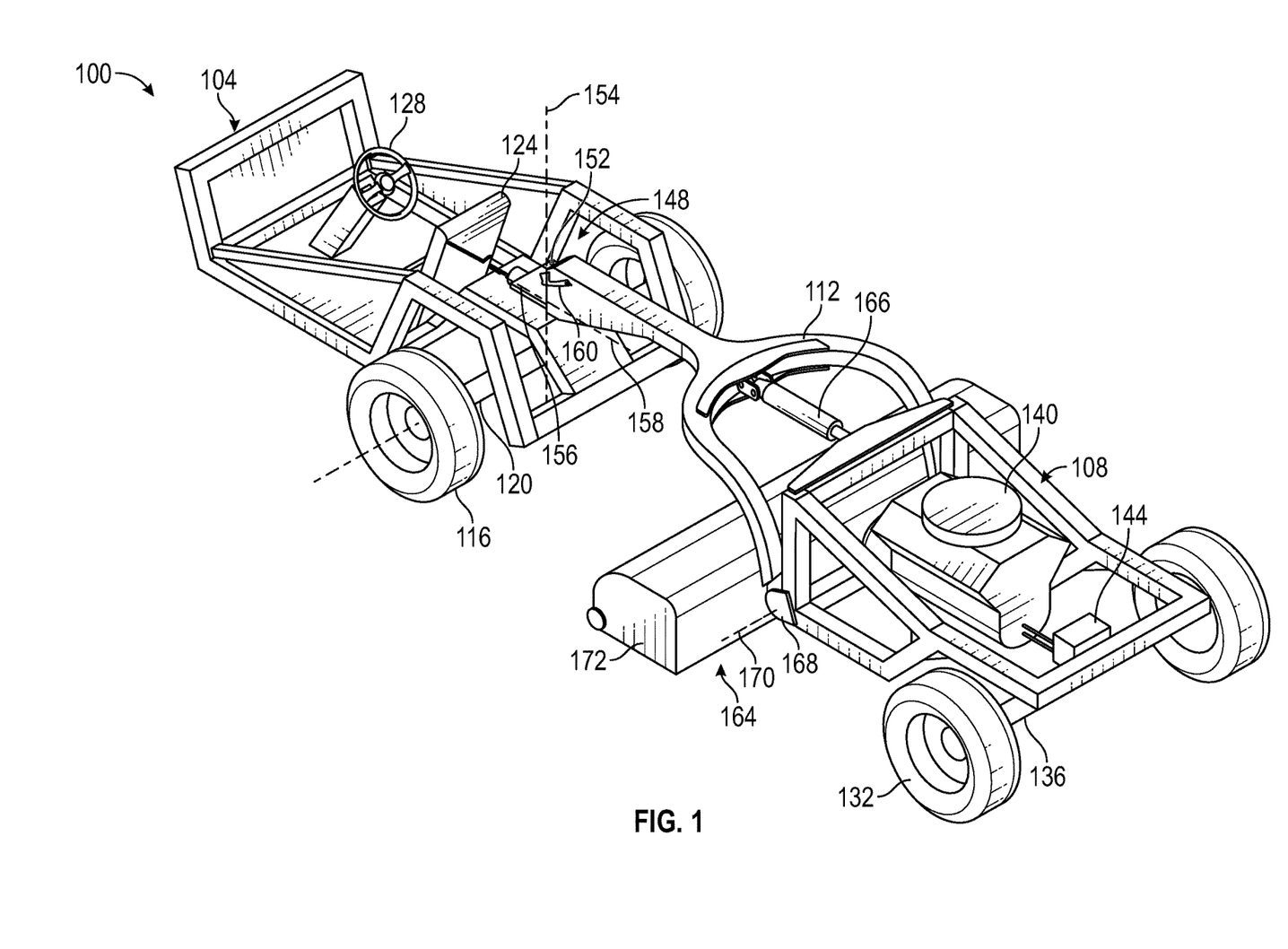
FIG. 1 is a perspective view of a low profile vehicle in accordance with embodiments of the present disclosure.
Figure 2:
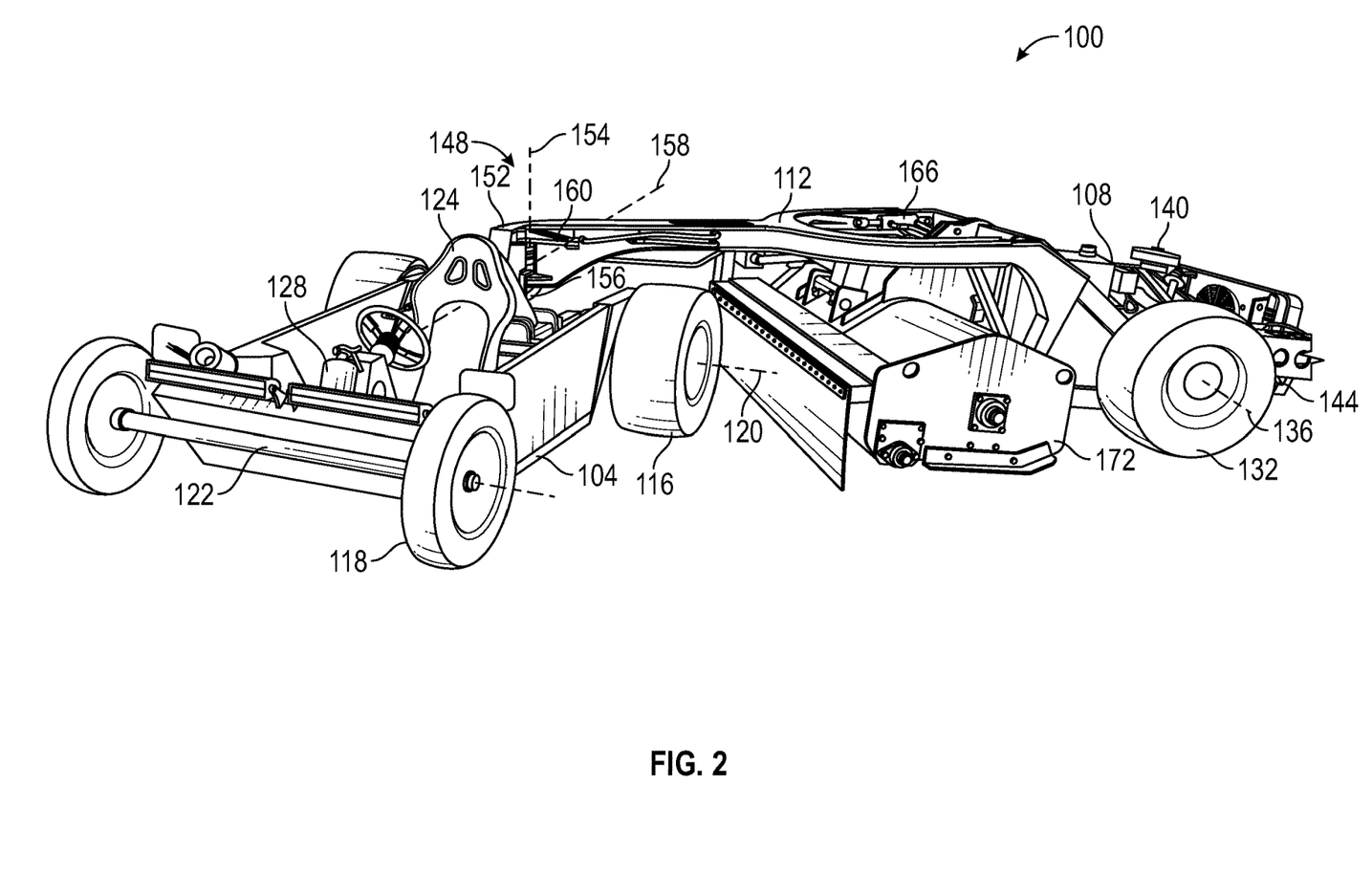
FIG. 2 is a perspective view of a low profile vehicle in accordance with other embodiments of the present disclosure.
Figure 3:
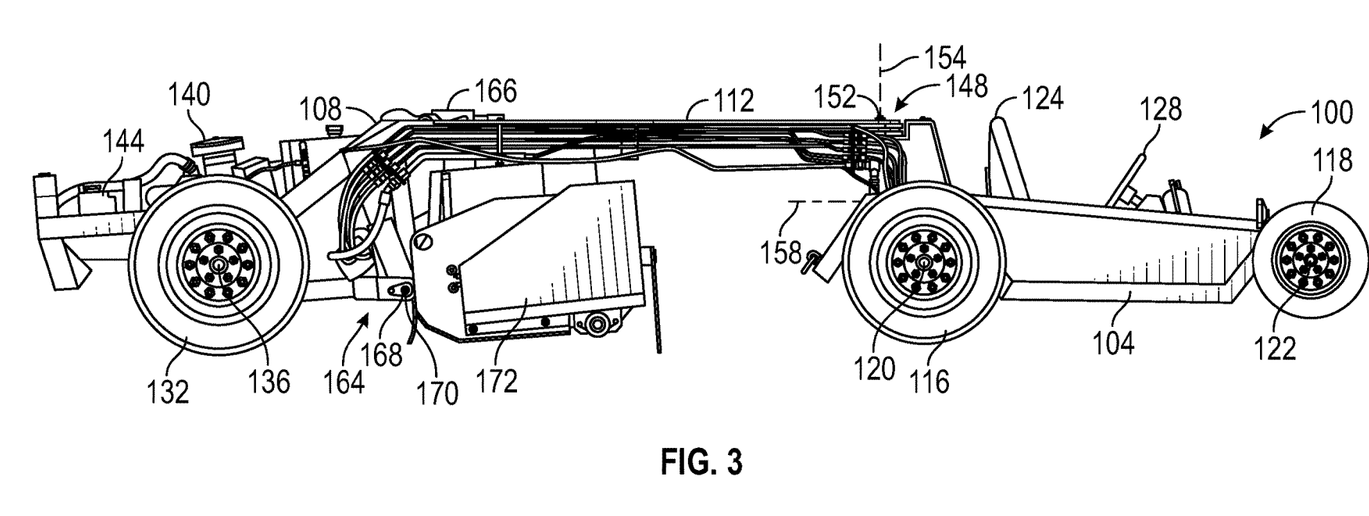
FIG. 3 is a view in elevation of a low profile vehicle in accordance with other embodiments of the present disclosure.

FIGS. 1 and 2 are perspective views of embodiments of a low profile vehicle 100 in accordance with embodiments of the present disclosure. FIG. 3 is a side elevation view of the embodiment of the low profile vehicle depicted in FIG. 2. The vehicle 100 generally includes a front module 104 that is connected to a rear module 108 by a central truss 112. The front module 104 includes a first or primary pair of front wheels 116 mounted to a rearward portion of the front module 104 along a primary front wheel axle line 120, an operator seat 124, and operator controls 128. The rear module 108 includes a pair of rear wheels 132 positioned along a rear axle line 136, an engine 140, and a hydraulic pump 144. In accordance with at least some embodiments, and as depicted in FIGS. 2 and 3, the low profile vehicle 100 can also include an auxiliary or second pair of front wheels 118 mounted to a forward portion of the front module along an auxiliary wheel axle line 122.

The central truss 112 is joined to the front module 104 by a front pivot assembly 148. The front pivot assembly 148 includes a vertical pivot 152 and a front horizontal pivot 156. The vertical pivot 152 has a pivot axis 154 and allows the angle of the front module 104 to be varied relative to the central truss 112 and the rear module 108 in a horizontal plane (i.e. a plane that is parallel to the ground). The front horizontal pivot 156 has a pivot axis 158 and allows the angle of the front module 104 to be varied relative to the central truss 112 and the rear module 108 in a vertical plane (i.e. in a plane that is perpendicular to the ground). As can be appreciated by one of skill in the art after consideration of the present disclosure, the terms vertical and horizontal are relative such that the axes 154 and 158 of the pivots 152 and 156 need not be orthogonal to their respective reference planes. In accordance with embodiments of the present disclosure, the front pivot assembly 148 can include a steering linkage 160 that is operable to control the angle of the front module 104 relative to the rear module 108 in the horizontal plane for purposes of steering the vehicle 100.

The central truss 112 is joined to the rear module 108 by a rear pivot assembly 164. The rear pivot assembly 164 includes rear horizontal pivots 168 and a hydraulic ram or lifting cylinder 166. The rear horizontal pivots 168 have a pivot axis 170 and allows the angle of the rear module 108 to be varied relative to the central truss 112 in a longitudinal vertical plane. Where, for example, the vehicle 100 is a mower having a mower assembly or attachment 172, the height of the mower assembly 172 relative to the ground can be controlled by varying the length of the lifting cylinder 166, and thereby varying the angle of the rear module 108 relative to the central truss 112. For example, in the embodiment illustrated in FIG. 1, by extending the lifting cylinder 166 the mower assembly 172 can be lifted relative to the ground, and by shortening the lifting cylinder 144 the mower assembly 172 can be lowered relative to the ground.

Figure 4:
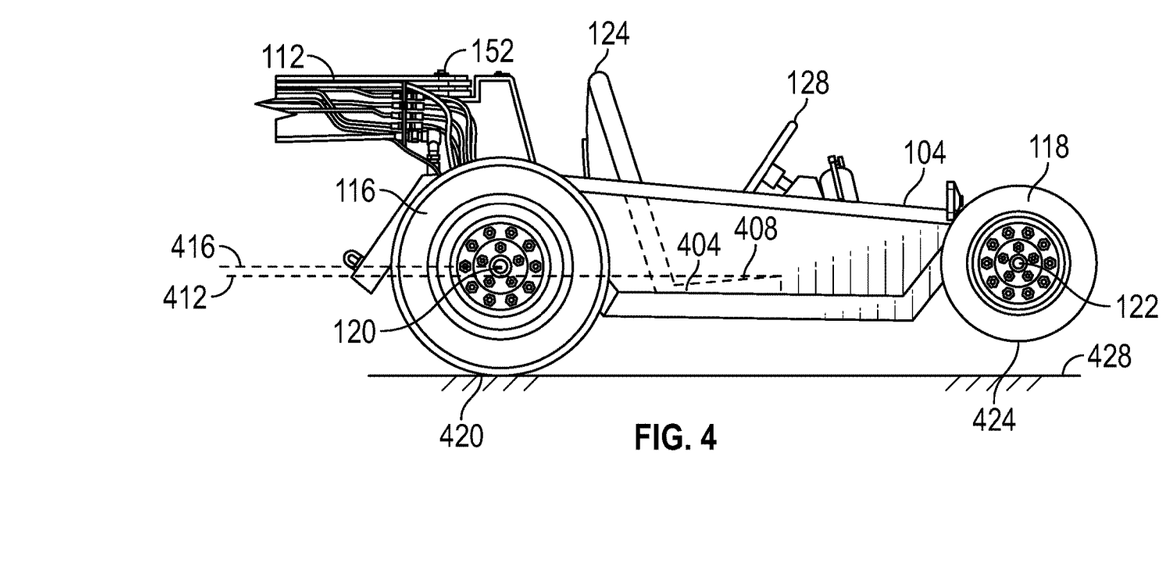
FIG. 4 is a view in elevation of a front module of a low profile vehicle in accordance with other embodiments of the present disclosure.

FIG. 4 depicts the front module 104 and a portion of the central truss 112 in elevation. In addition, the lower portion or bottom cushion 404 of the operator seat 124 is shown in dotted lines, to illustrate that the support surface 408 of the lower portion 404 (i.e. the surface that supports the operator) is below the primary front wheel axle line 120. More particularly, as shown by line 412, corresponding to the uppermost portion of the support surface 408, the support surface 408 of the operator seat 124 is below the level of the primary front wheel axle line 120, shown by line 416. This is an important design feature, as it allows the vehicle 100 to have a very low profile. For example, embodiments of the present disclosure can provide a vehicle 100 with a mower assembly 172 that is no taller than 46 inches, allowing the vehicle 100 to be driven under many ground mounted solar panels.

FIG. 4 also depicts an embodiment of the low profile vehicle 100 in which an auxiliary pair of front wheels 118 is provided. As shown, the support surface 408 of the operator seat 124 may be below the auxiliary wheel axle line 122. In addition to being below the primary front wheel axle line 120. In this embodiment, a contact patch or lower surface 420 of the primary front wheels 116 is lower than a contact patch or lower surface 424 of the auxiliary front wheels 118, at least while the vehicle 100 is on level ground 428. In accordance with further embodiments of the present disclosure, the auxiliary axle line 122 may be above the primary front wheel axle line 120.

Figure 5:
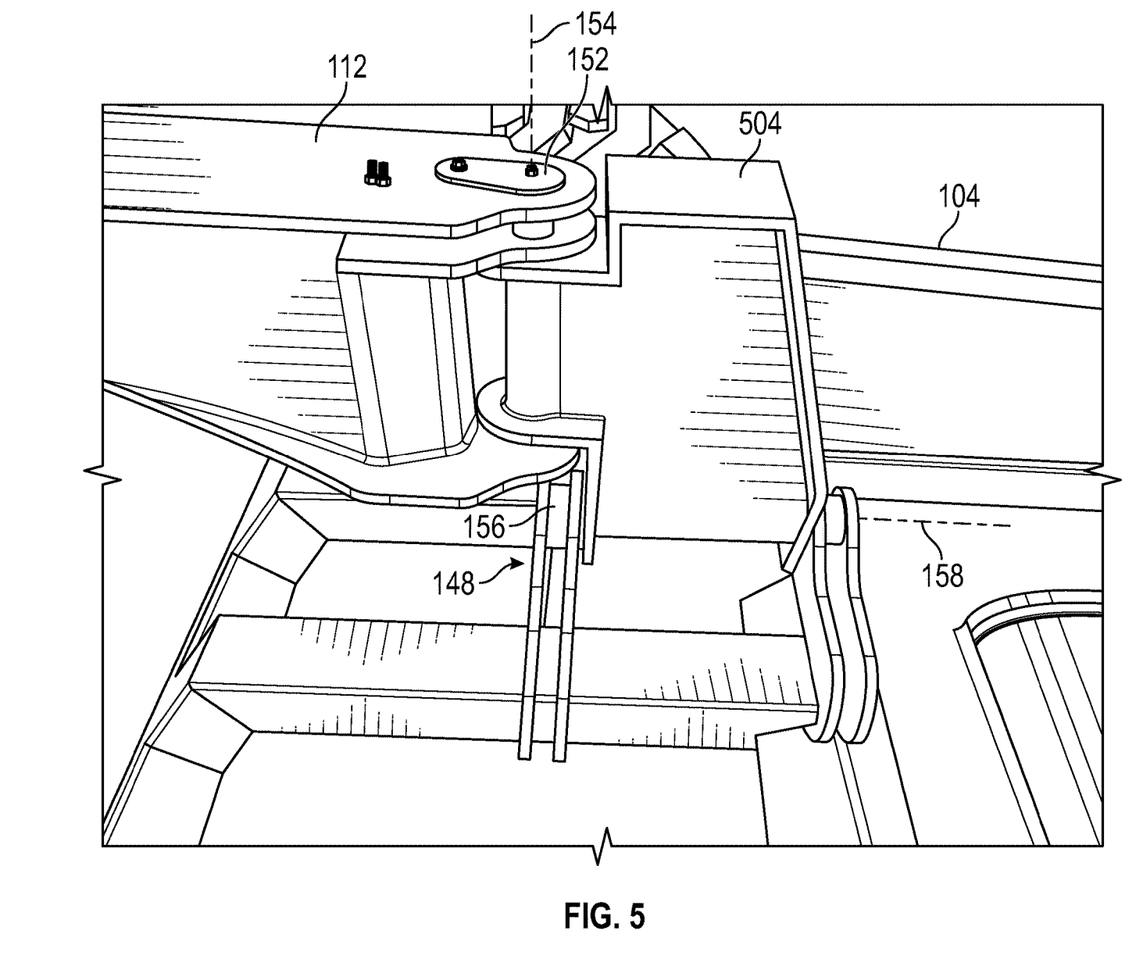
FIG. 5 is a perspective view of a front pivot assembly in accordance with embodiments of the present disclosure.

FIG. 5 is a detail of the front pivot assembly 148. In particular, in accordance with at least some embodiments, the central truss 112 is joined to a linking member 504 by the vertical pivot 152. The linking member 504 is in turn joined to the front module 112 by the front horizontal pivot 156.

Figure 6:
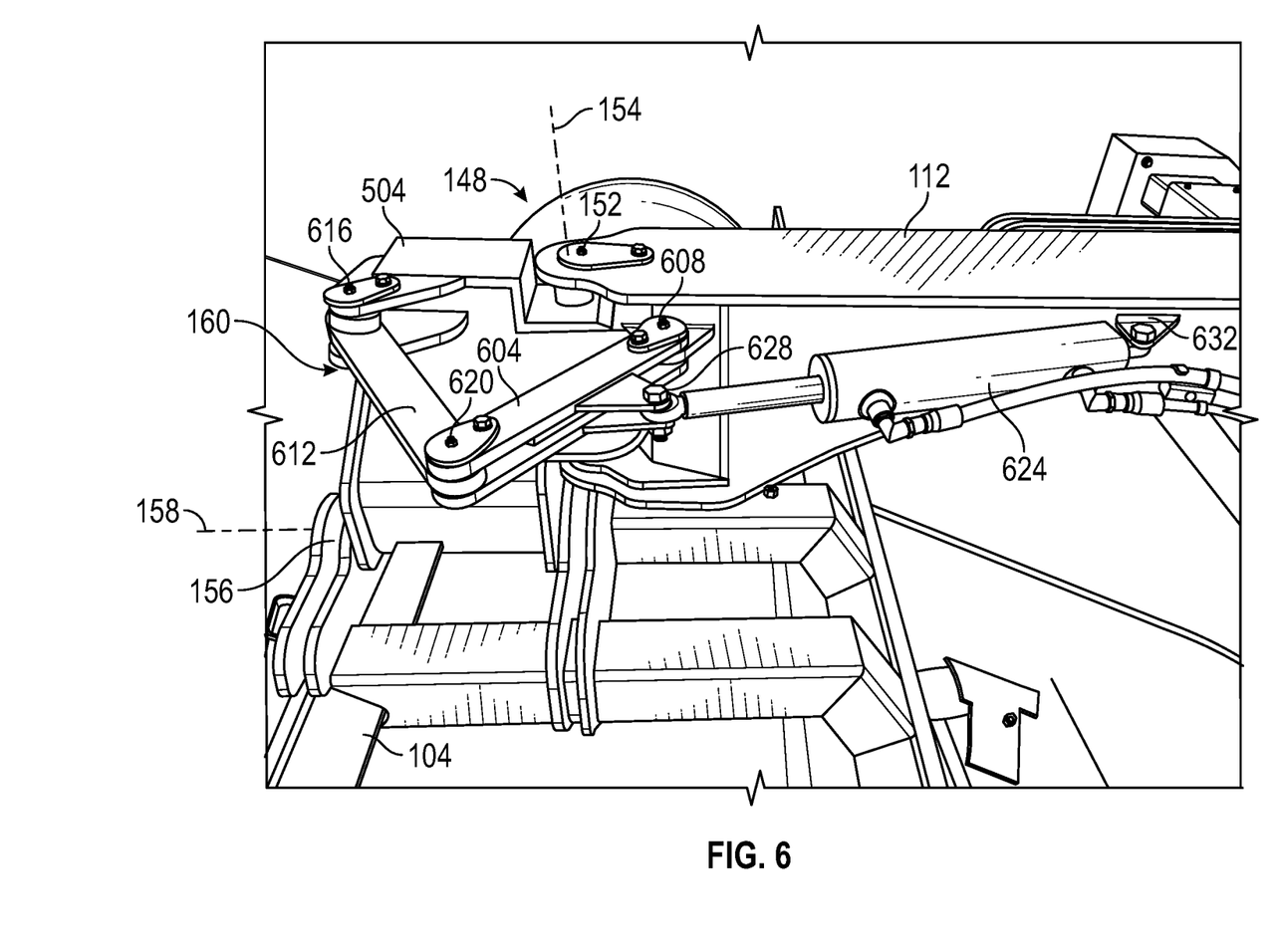
FIG. 6 is a perspective view showing a steering linkage in accordance with embodiments of the present disclosure.
Figure 7:
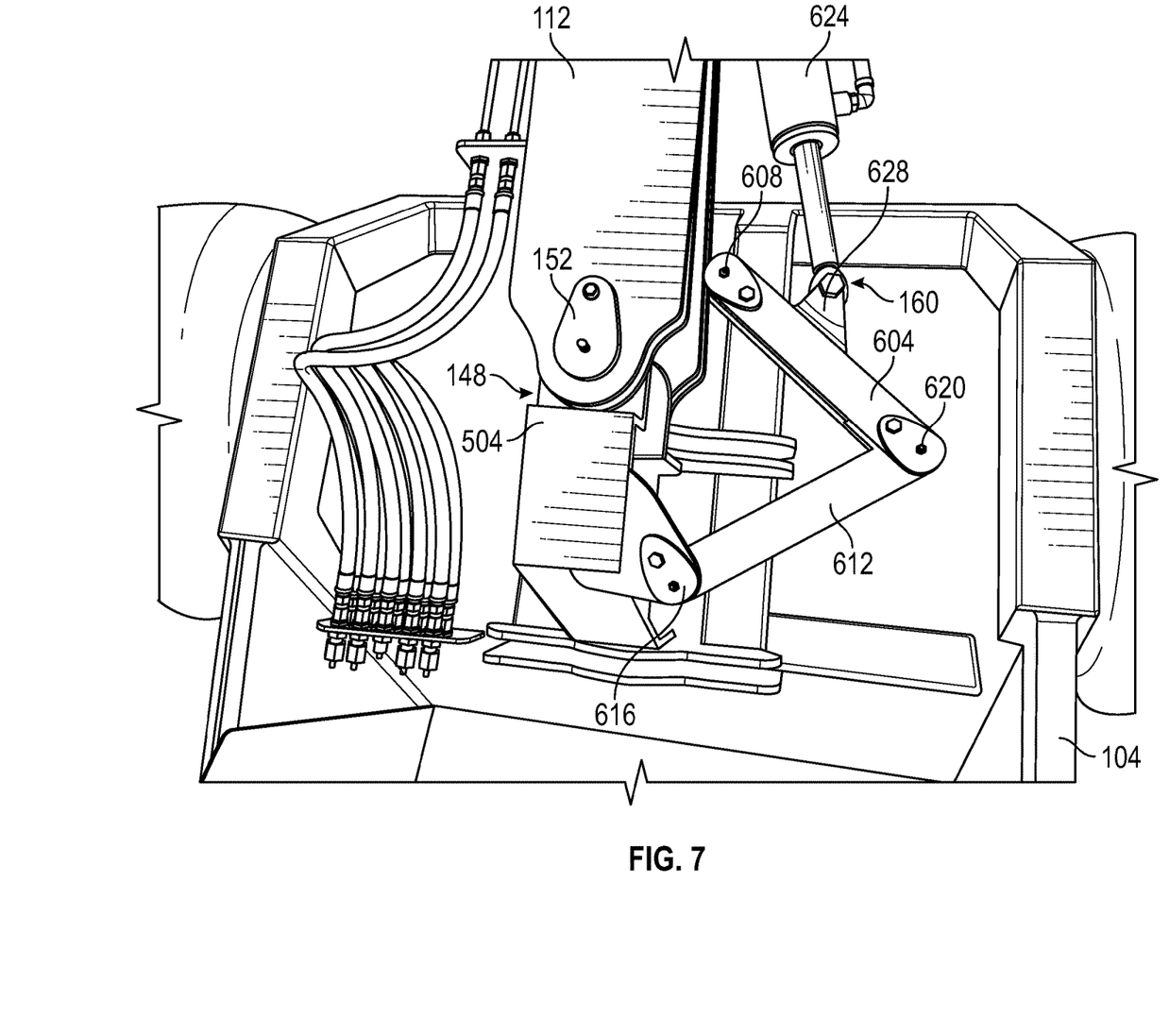
FIG. 7 is a top perspective view showing a steering linkage in accordance with embodiments of the present disclosure.

FIGS. 6-7 show a steering linkage 160 in accordance with embodiments of the present disclosure. In general, the steering linkage 160 provides a motive force that allows the operator to selectively vary the angle of the front module 104 relative to the rear module 108 in order to steer the vehicle 100. The steering linkage 160 includes a first arm 604 with a first end that is connected to the central truss 112 at a first pivot point 608, and a second arm 612 with a first end that is connected to the front module 104 by a second pivot point 616. A second end of the first arm 604 is joined to a second end of the second arm 612 at a third pivot point or connecting pivot 620. In accordance with at least some embodiments of the present disclosure, the pivot axes of the first 608, second 616, and third 620 pivot points are all parallel to the pivot axis 154 of the vertical pivot 152 of the front pivot assembly 148. A steering hydraulic ram or steering cylinder 624 extends between a pivot 628 between the first and second ends of the first arm 604 and a pivot 632 on the central truss 112. Configured as shown in the illustrated example, the vehicle 100 can be steered to the right when the steering cylinder 624 is extended, and can be steered to the left when the steering cylinder 624 is shortened. In accordance with other embodiments, the steering linkage 160 can be on the other side of the front pivot assembly 148, or can include components disposed on both sides of the front pivot assembly 148.

The engine 140 can be configured to drive the hydraulic pump 144. Hydraulic pressure created by the hydraulic pump 144 can be used to drive hydraulic motors (not shown) that turn the rear wheels 132, and the various rams or cylinders, such as the rams 166 and 624. The engine 140 can also be configured to drive the mower assembly 172 directly, or via the hydraulic pump 144.

The mower assembly 172 is, for example, a flail type mower that is mounted to the rear module 108. In accordance with embodiments of the present disclosure, the mower assembly 172 can use a three point hitch type connection that connects the mower assembly 172 to the rear module 108.

As an example, but without limitation, the flail mower 172 can have a width of approximately 9 feet. In addition, the height of the low-profile mower can, in at least some embodiments, be less than or equal to 46 inches. In further embodiments, the height of the low-profile mower can be less than or equal to 41 inches. The incorporation of a flail mower in a vehicle having a very low maximum height enables the low-profile mower to be used under solar panel assemblies, pipelines, or other installations where it is desirable to control the growth of weeds, and where a low-profile is necessary in order to avoid or minimize contact with installed structures.

The foregoing discussion of embodiments of the present disclosure has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A vehicle, comprising:
a front module, including:
at least a first wheel;
a seat, wherein a bottom of the seat is below an axle line of the first wheel;
a front pivot assembly;
a central truss, wherein the central truss is connected to the front module by the front pivot assembly;
a rear pivot assembly; and
a rear module, including:
at least a first wheel, wherein the rear module is connected to the central truss by the rear pivot assembly.

2. The vehicle of claim 1, wherein the front module includes a second wheel in addition to the first wheel, wherein the axle line of the first wheel of the front module is coincident with an axle line of the second wheel of the front module, and wherein the axle line of the first and second wheels of the front module passes through a rearward portion of the front module.

3. The vehicle of claim 2, further comprising:
an auxiliary set of wheels mounted to a forward portion of the front module, wherein the axle line of the first and second wheels of the front module is below the axle line of the auxiliary set of wheels.

4. The vehicle of claim 1, further comprising:
an auxiliary set of wheels mounted to a forward portion of the front module, wherein the bottom of the seat is below an axle line of the auxiliary set of wheels.

5. The vehicle of claim 1, wherein the front pivot assembly permits movement of the front module relative to the central truss in first and second planes, the vehicle further comprising:
a steering linkage, wherein the steering linkage controls an angle of the front module relative to the central truss in a horizontal plane.

6. The vehicle of claim 5, wherein the steering linkage includes:
a first arm, wherein a first end of the first arm is connected to the central truss by a first pivot point having a pivot axis that is perpendicular to the horizontal plane;
a second arm, wherein a first end of the second arm is connected to the front module by a second pivot point having a pivot axis that is perpendicular to the horizontal plane, and wherein a second end of the second arm is connected to a second end of the first arm by a connecting pivot having a pivot axis that is perpendicular to the horizontal plane.

7. The vehicle of claim 6, further comprising:
a hydraulic ram, wherein a first end of the hydraulic ram is connected to the central truss, and wherein a second end of the hydraulic ram is connected to the first arm of the steering linkage.

8. The vehicle of claim 7, wherein the second pivot point is connected to the front module by a linking member, wherein the linking member is connected to the front module by a horizontal pivot of the front pivot assembly, and wherein the linking member is connected to the central truss by a vertical joint of the front pivot assembly.

9. The vehicle of claim 1, further comprising:
a mower assembly, wherein the mower assembly is mounted to the rear module.

10. The vehicle of claim 9, wherein a height of the mower assembly is controlled by a hydraulic ram acting on the rear pivot assembly.

11. The vehicle of claim 10, wherein the mower assembly is a flail mower assembly.

12. The vehicle of claim 9, further comprising:
an engine, wherein the engine is mounted to the rear module.

13. The vehicle of claim 12, further comprising:
a hydraulic pump, wherein the hydraulic pump is mounted to the rear module and is driven by the engine, and wherein pressurized hydraulic fluid is supplied from the hydraulic pump to drive the rear wheels, to act on the steering linkage, to act on the rear pivot assembly, and to power the mower assembly.

14. A vehicle, comprising:
a front module, including:
a first pair of wheels, wherein the first pair of wheels is mounted to a rearward portion of the front module;
a second pair of wheels, wherein the second pair of wheels is mounted to a forward portion of the front module;
a seat, wherein a support surface of a lower portion of the seat is below an axle line of the first pair of wheels, and wherein the support surface of the lower portion of the seat is below an axle line of the second pair of wheels; and a rear module, including:
a third pair of wheels, wherein the rear module is interconnected to the front module.

15. The vehicle of claim 14, wherein the axle line of the second pair of wheels is above the axle line of the first pair of wheels.

16. The vehicle of claim 15, wherein with a horizontal reference surface in contact with the first and third pairs of wheels, the second pair of wheels is not in contact with the reference surface.

17. The vehicle of claim 16, further comprising:
a mower assembly, wherein the mower assembly is located between the axle line of the first pair of wheels and an axle line of the third pair of wheels.

18. The vehicle of claim 17, further comprising:
an engine, wherein the engine is mounted to the rear module, and wherein the engine powers at least the third pair of wheels and the mower assembly.

19. A method of mowing beneath a structure, comprising:
providing a self-propelled vehicle having an operator seat beneath an axle line of the vehicle and having a mower assembly; and
driving the vehicle under at least a portion of the structure while operating the mower assembly.

20. The method of claim 19, further comprising:
providing motive power to the vehicle and to the mower assembly from a hydraulic pump driven by an engine.

* * * * *